United States Patent [19]

Tsuchiya et al.

[11] Patent Number: 4,646,161
[45] Date of Patent: Feb. 24, 1987

[54] AUTOMATIC WHITE BALANCE CONTROL CIRCUIT

[75] Inventors: Satoshi Tsuchiya; Minoru Aoyagi; Yasunobu Kuniyoshi, all of Tokyo, Japan

[73] Assignee: Sony Corporation, Tokyo, Japan

[21] Appl. No.: 774,584

[22] Filed: Sep. 10, 1985

[30] Foreign Application Priority Data

Sep. 11, 1984 [JP] Japan .............................. 59-190269

[51] Int. Cl.[4] ...................... H04N 9/64; H04N 9/04; H04N 9/07
[52] U.S. Cl. ...................................... 358/29; 358/41; 358/44
[58] Field of Search .................. 358/29 C, 29 F, 29, 358/41, 44, 50

[56] References Cited

U.S. PATENT DOCUMENTS

| 4,123,775 | 10/1978 | Bugni | 358/29 |
|---|---|---|---|
| 4,281,337 | 7/1981 | Nakamura | 358/29 C |
| 4,368,482 | 1/1983 | Machida et al. | 358/29 C |
| 4,486,771 | 12/1984 | Machida et al. | 358/29 C |
| 4,574,303 | 3/1986 | Hashimoto et al. | 358/29 |
| 4,605,955 | 8/1986 | Hashimoto et al. | 358/29 |

FOREIGN PATENT DOCUMENTS

| 55-136782 | 10/1980 | Japan | 358/29 |
|---|---|---|---|
| 56-42482 | 4/1981 | Japan | 358/29 |
| 56-36292 | 4/1981 | Japan | 358/29 |
| 57-26978 | 2/1982 | Japan | 358/29 |

Primary Examiner—James J. Groody
Assistant Examiner—Cynthia Smith
Attorney, Agent, or Firm—Lewis H. Eslinger; Alvin Sinderbrand

[57] ABSTRACT

A fully automatic white balance control circuit which is sensitive to changes in the ambient or incident illumination as well as to changes in the object being viewed includes a main photo-sensor having a video output from which three primary color signals are derived, three external or incident light sensing elements having spectral characteristics the same as those of the main photo-sensor for the three primary colors, three capacitors for converting output currents from the three external light sensing elements to respective voltages, a voltage comparator for comparing a voltage across at least the one capacitor corresponding to green light with a reference voltage, and three sample-and-hold circuits for sampling and holding voltages from the three capacitors, respectively. Charging of the three capacitors by output currents from the three external light sensing elements, respectively, is started at the commencement of each cycle, for example, each vertical period, and, when the voltage comparator produces a compared output in response to the voltage across the one capacitor having become equal to the reference voltage, the charging is stopped and the voltages then present on the three capacitors are sampled and held by the three sample-and-hold circuits to thereby provide white balance control signals by which the level ratios of the three primary color signals derived from the main photo-sensor are controlled to be 1:1:1 thereby to adjust the white balance.

13 Claims, 9 Drawing Figures

AUTOMATIC WHITE BALANCE CONTROL CIRCUIT

BACKGROUND OF THE INVENTION

1. Field of the Invention

This invention relates to an automatic white balance control circuit for a video camera.

2. Description of the Prior Art

In a video camera, if the white balance thereof is not adjusted, the hue of a reproduced video signal is displaced by the color temperature of an object in the field of view of the camera.

Therefore, several automatic white balance control circuits have been proposed in the prior art, for example, as disclosed in U.K. Pat. specification No. 1,291,601, published Oct. 4, 1972. One of such prior art circuits comprises, independently of a main pick-up element or photo-sensor which picks up an image of the object, an external light sensing element having the same spectral characteristic as the main photo-sensor and in front of which there is located a white semi-transparent plate. From the external light sensing element there are derived three primary color signals that are equivalent to those provided by the main photo-sensor when a white object is picked up by the latter and the three primary color signals derived from the external light sensing element are used to control the three primary color signals from the main photo-sensor so as to have a level ratio of 1:1:1. Accordingly, the three level controlled primary color signals are adjusted as to their white balance.

Generally, the video camera is provided with an automatic iris or stop control mechanism by which the amount of light introduced from the object to the main photo-sensor is maintained substantially constant. Thus, the levels of the three primary color signals are substantially constant regardless of the pick-up circumstances for the object.

However, since the light incident on the external light sensing element is used to obtain the color temperature of the object, the incident light has to be an average of the illumination from as wide an area as possible, and not merely the illumination incident on the object in the field of view of the camera. Therefore, it is not possible to use the light that is introduced to the main photo-sensor via the automatic stop mechanism as the light incident on the external light sensing element. As a result, when the external light is changed, for example, from incandescent light bulbs to natural daylight the level of the output signal from the external light sensing element is changed considerably.

Accordingly, when the white balance of the three primary color signals derived from the main photo-sensor is adjusted by using the output signal from the external light sensing element, the output signal from the external light sensing element must be compressed in level in accordance with the characteristic of the automatic stop control mechanism.

When the level of the output signal from the external light sensing element is compressed, a level control of about 80 dB must be carried out in response to the range in which the external light is changed. In order to carry out a level control of 80 dB, it is known to employ a logarithmic amplifier or to employ an AGC (automatic gain control) amplifier connected in multi-stages.

When the logarithmic amplifier is used, the output signal thereof varies in a logarithmic fashion so that, when the level ratio of the primary color signals is controlled to be 1:1:1, processing of the inverse logarithm becomes necessary and this requires a microcomputer. On the other hand, when the AGC amplifier is connected in multi-stages, the AGC amplifier develops a very high gain and is easy to oscillate and becomes unstable if not oscillated. Further, in any case, if the gain is scattered, it is not possible to accurately control the level ratio to maintain the desired 1:1:1 ratio.

OBJECTS AND SUMMARY OF THE INVENTION

Accordingly, it is an object of this invention to provide a fully automatic white balance control circuit which can adjust the white balance of a video camera precisely and avoids the above-mentioned problems associated with the prior art.

It is another object of this invention to provide an automatic white balance control circuit for use with a video camera which can avoid the problems associated with the use of a logarithmic amplifier or a multi-stage AGC, (automatic gain control) amplifier.

It is a further object of this invention to provide an automatic white balance control circuit capable of operating stably and which can effect fully automatic white balance control when the nature of the incident illumination is drastically changed, for example, from illumination by incandescent light bulbs to daylight illumination.

In accordance with an aspect of the present invention, there is provided a fully automatic white balance control circuit comprising: a main photo-sensor for providing a color video signal which is processed for deriving therefrom three primary color signals including a green color signal; three external light sensing elements having spectral characteristics which are the same as those of said main photo-sensor for the three primary colors; three capacitors for converting output currents from the three external light sensing elements to respective voltages; a voltage comparator for comparing, with a reference voltage, a voltage across at least the one capacitor corresponding to green light; three sample-and-hold circuits for sampling and holding voltages from the three capacitors, respectively, means for starting the charging of the three capacitors by the output currents from the respective external light sensing elements at the commencement of each operating cycle, for example, each vertical period; means operative when said voltage comparator produces a compared output for stopping the charging of said capacitors and causing the three sample-and-hold circuits to sample and hold the voltages then present on the respective capacitors and thereby provide white balance control voltages; and means responsive to said white balance control voltages for controlling the relative levels of said three primary color signals for maintaining the level ratio 1:1:1, thereby to adjust the white balance.

The above, and other objects, features and advantages of the present invention, will become apparent from the following detailed description of illustrative embodiments thereof to be read in conjunction with the accompanying drawings, throughout which like reference numerals designate the same elements and parts.

DESCRIPTION OF THE PREFERRED EMBODIMENTS

Figure 1:
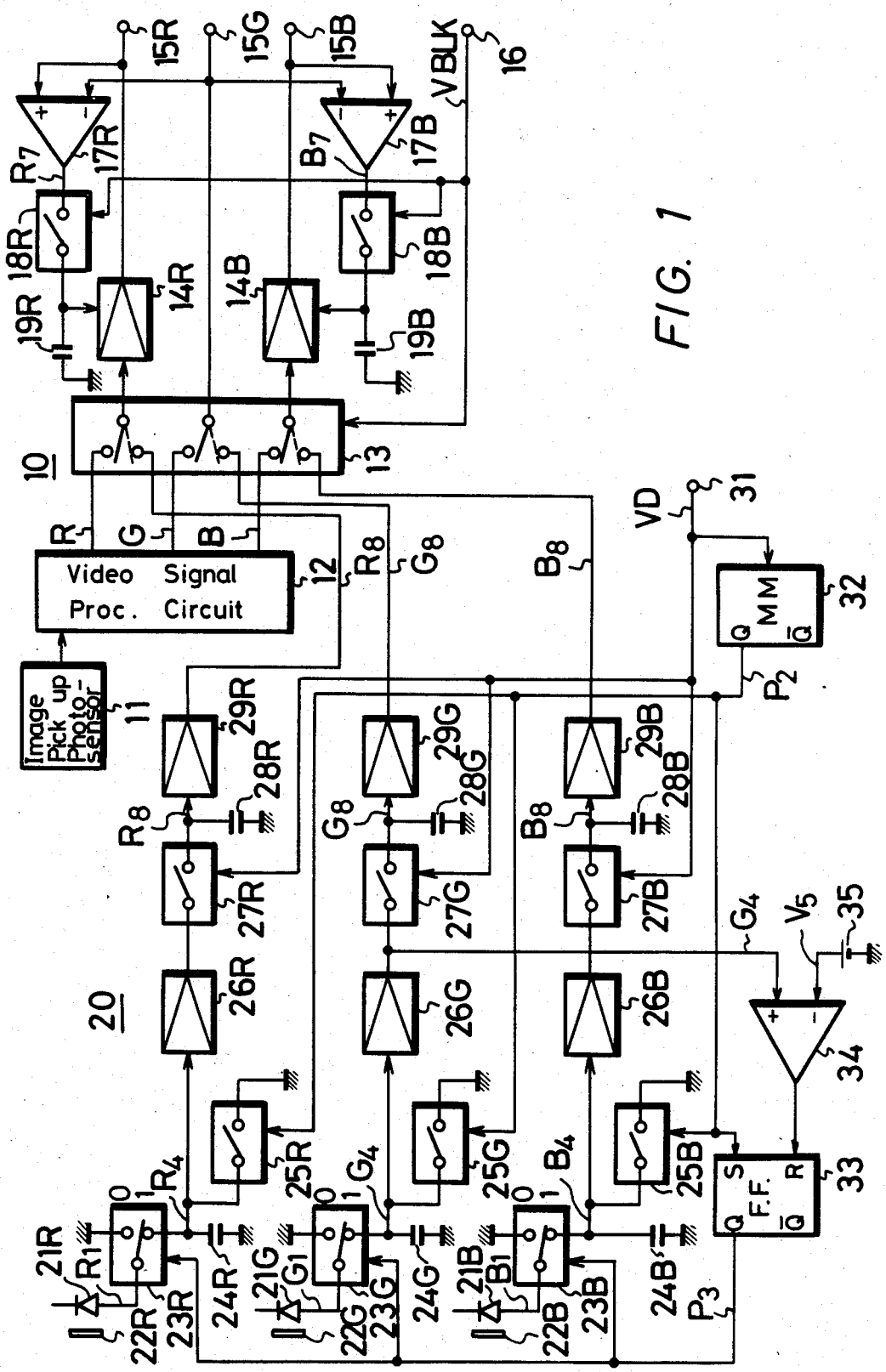
FIG. 1 is a systematic block diagram showing an automatic white balance control circuit according to an embodiment of this invention in association with the main pick-up signal system of a color video camera.

The present invention will now be described in detail with reference to FIG. 1 in which an automatic white balance control circuit 20 according to an embodiment of this invention is shown associated with a main pick-up signal system 10 of a color video camera.

The main pick-up signal system 10 is shown to include an image pick-up device or photo-sensor 11, such as, a pick-up tube, pick-up plate or the like. The color video output from this pick-up device 11 is supplied to a video signal processing circuit 12 in which three primary color signals R,G and B of red, green and blue colors are provided. These three primary color signals R,G and B are supplied to a switching circuit 13. Switching circuit 13 is supplied with a vertical blanking pulse VBLK from a terminal 16 as a control signal therefor so that, during the vertical scanning interval, switching circuit 13 is connected or disposed as shown in full lines on FIG. 1, whereas, during the vertical blanking interval, it is changed-over to the opposite state indicated in dotted lines on FIG. 1. Accordingly, switching circuit 13 passes therethrough the signals R,G,B from video processing circuit 12 during the vertical scanning interval.

The signal G is delivered directly, or as is to a terminal 15G, and the signals R and B are supplied through gain control amplifiers 14R and 14B to terminals 15R and 15B, respectively.

The white balance control circuit 20 is shown to include photo-diodes 21R, 21G and 21B which serve as external light sensing elements. In front of the photo-diodes 21R, 21G and 21B, there are provided optical filters 22R, 22G and 22B having the same spectral characteristics as pick-up device 11 in respect to light rays of three primary colors, that is, red light, green light and blue light, respectively. Though not shown, white semi-transparent plates are desirably provided at the front of optical filters 22R, 22G and 22B as a light diffusing plate so that photo-diodes 21R, 21G and 21B produce currents $R_1, G_1$ and $B_1$ having levels corresponding to the intensities of three primary color light components, respectively, of the incident or ambient light which irradiates or illuminates an object (not shown) in the field of view of the color video camera. The output currents $R_1, G_1$ and $B_1$ are supplied to switching circuits 23R, 23G and 23B, respectively, and parallel circuits formed of integration or charging capacitors 24R, 24G and 24B and normally-opened switching circuits 25R, 25G and 25B, respectively, are connected between contacts "1" of the switching circuits 23R, 23G and 23B, respectively, and ground. The other, or normally engaged "0" contacts of switching circuits 23R, 23G and 23B are connected to ground.

Further, a vertical synchronizing pulse VD (Fig. 2A) is applied to a terminal 31 from which it is supplied to a monostable multivibrator 32. The multivibrator 32 forms a delay pulse $P_2$ (FIG. 2B) which is triggered or rises at the trailing edge (time $t_1$) of the vertical synchronizing pulse VD and which falls after a predetermined short time, namely, at a time $t_2$. This pulse $P_2$ is supplied to switching circuits 25R, 25G and 25B as the control signal therefor and, when $P_2 =$ "1", switching circuits 25R, 25G and 25B are turned ON. Further, pulse $P_2$ is supplied to an RS flip-flop circuit 33 as its set input. As shown on FIG. 2C, flip-flop circuit 33 produces a pulse $P_3$ which rises at the time $t_2$ of the trailing edge of pulse $P_2$. Pulse $P_3$ is supplied to switching circuits 23R, 23G and 23B as the control signal therefor so that, when $P_3 =$ "1", switching circuits 23R, 23G and 23B are changed-over to the state or condition shown in FIG. 1, that is, engage their respective "1" contacts.

Accordingly, upon the occurrence of each vertical synchronizing pulse VD, switching circuits 25R, 25G and 25B are temporarily turned ON by pulse $P_2$ during the period from time $t_1$ to $t_2$, with the result that terminal voltages $R_4, G_4$ and $B_4$ across capacitors 24R, 24G and 24B are discharged to zero during that period. However, after the time $t_2$, switching circuits 25R, 25G and 25B are turned OFF or opened at the falling edge of pulse $P_2$, and switching circuits 23R, 23G and 23B are changed-over to the state shown in FIG. 1 by the pulse $P_3$ so that, after the time $t_2$, capacitors 24R, 24G and 24B are charged by the output currents $R_1, G_1$ and $B_1$ from photo-diodes 21R, 21G and 21B, respectively. Thus, the terminal voltages across capacitors 24R, 24G and 24B are gradually increased from zero after the time $t_2$. Since the outputs of photo-diodes 21R, 21G and 21B have constant current characteristics, the voltages $R_4, G_4$ and $B_4$ are increased rectilinearly. Further, if the amount of light incident on the photo-diode 21G is large, the output current $G_1$ thereof is large so that, as shown by the broken line on FIG. 2E, the voltage $G_4$ is increased rapidly. If, on the other hand, the amount of incident light on photo-diode 21G is small, the output current $G_4$ is small so that as shown by the dot-dash line of FIG. 2E, the voltage $G_4$ is increased slowly. The same can be said for the voltages $R_4$ and $B_4$.

The voltage $G_4$ across capacitor 24G is supplied through a buffer amplifier 26G to one input of a voltage comparing circuit or voltage comparator 34 and a reference voltage $V_5$ from a voltage source 35 is supplied to another input of voltage comparator 34. The resulting or compared output from voltage comparator 34 is applied as a reset input to flip-flop circuit 33 so that, when $G_4 \geq V_5$, flip-flop circuit 33 is reset.

Accordingly, if the voltage $G_4$ is increased to satisfy $G_4 = V_5$ at a time $t_3$ after the time $t_2$, flip-flop circuit 33 is reset to provide $P_3 =$ "0" at the time $t_3$.

When pulse $P_3$ becomes zero, switching circuits 23R, 23G and 23B are changed-over to the state opposite to that shown in FIG. 1, that is, to the state in which contacts "0" connected to the ground are engaged. Thus, after the time $t_3$, capacitors 24R, 24G and 24B are no longer being charged and maintain the respective levels achieved at the time $t_3$.

When the pulse VD is supplied during the next vertical or field period, similar operations will be repeated as hereinbelow.

In this case, during each field period, the time $t_3$ is the time at which $G_4=V_5$ is established. Accordingly, although the interval from the time $t_2$ to the time $t_3$ is changed by the amount of incident light on photodiode 21G, the voltage is constant ($G_4=V_5$) during the period from $t_3$ to $t_1$. Also, the voltages $R_4$ and $B_4$ remain constant during the period from $t_3$ to $t_1$ at the levels thereof attained at the time $t_3$. These levels are in proportion to the amounts of lights that are incident on the photodiodes 21R,21G and 21B, respectively. More specifically, the voltages $R_4,G_4$ and $B_4$, during the period from $t_3$ to $t_1$, indicate the amounts of red, green and blue light incident on the photo-diodes 21R,21G and 21B, respectively. Also at that time, the voltages $R_4$ and $B_4$ are standardized or unchanging with respect to the voltage $G_4$ as a reference and the voltage $G_4$ is made constant regardless of the amount of incident light.

Figure 2:
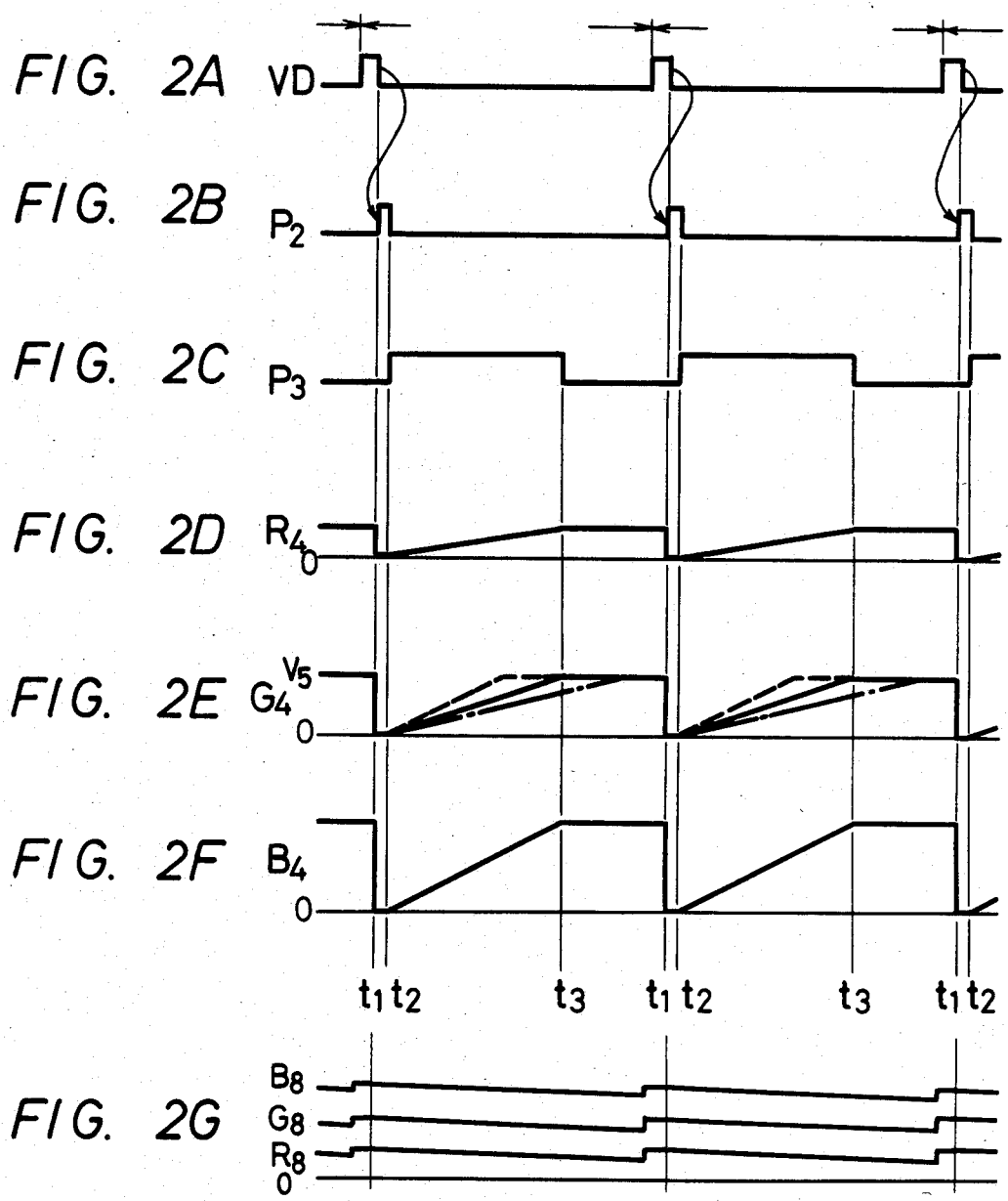
FIGS. 2A–2G show signal waveform diagrams, respectively, to which reference will be made in explaining the operation of the automatic white balance control circuit shown in FIG. 1.

Voltages $R_4,G_4$ and $B_4$ are shown to be supplied via buffer amplifiers 26R,26G and 26B to normally open switching circuits 27R,27G and 27B of respective sample and hold circuits. The pulse VD is supplied to switching circuits 27R,27G and 27B as the control signal therefor, whereby, near the end of the period from $t_3$ to $t_1$, switching circuits 27R,27G and 27B are momentarily closed for sampling the voltages $R_4,G_4$ and $B_4$, and the thus sampled voltages $R_8,G_8$ and $B_8$ are fed to respective capacitors 28R,28G and 28B, in which they are held until the next pulse VD is supplied to switching circuits 27R,27G and 27B. Accordingly, from the capacitors 28R,28G and 28B there are derived voltages $R_8,G_8$ and $B_8$ which are substantially constant during each field period and which are substantially equal in level to the voltages $R_4,G_4$ and $B_4$ during the period from $t_3$ to $t_1$, as shown in FIG. 2G.

During each vertical blanking period or interval, the gains of amplifiers 14R and 14B are set according to the voltages $R_8$ and $B_8$ thereby to adjust the white balance of the signals R,G and B. More specifically, voltages $R_8,G_8$ and $B_8$ are supplied through buffer amplifiers 29R,29G and 29B to switching circuit 13 and, during the vertical blanking interval, switching circuit 13 is changed-over to the state shown in broken lines on FIG. 1 by the vertical blanking pulse VBLK so that voltages $R_8,G_8$ and $B_8$ are derived from switching circuit 13. The voltages $R_8$ and $B_8$ are then supplied through amplifiers 14R and 14B to first inputs of voltage comparators 17R and 17B, respectively, and the voltage $G_8$ is supplied to second inputs of both voltage comparators 17R and 17B as the reference voltage therefor. Accordingly, voltage comparators 17R and 17B produce output voltages $R_7$ and $B_7$ corresponding to the deviations of the voltages $R_8$ and $B_8$ relative to the voltage $G_8$.

The compared output voltages $R_7$ and $B_7$ are supplied to normally open switching circuits 18R and 18B which are closed in response to the vertical blanking pulse VBLK for sampling the voltages $R_7$ and $B_7$. The voltages $R_7$ and $B_7$ thus sampled by switching circuits 18R and 18B, respectively, are applied to capacitors 19R and 19B, in which voltage $R_7$ and $B_7$ are held until the next pulse VBLK. The held voltages $R_7$ and $B_7$ are applied to amplifiers 14R and 14B as the gain control signals thereof so that the gains of amplifiers 14R and 14B are controlled for maintaining a level ratio of 1:1:1 for the voltages $R_8,G_8$ and $B_8$ produced at the terminals 15R,15G and 15B during the vertical blanking interval.

Accordingly, in the following vertical scanning interval, the three primary color signals R,G and B then passed through switching circuit 13 from video signal processing circuit 12 are controlled to have the level ratio 1:1:1 at the terminals 15R,15G and 15B by the effects of amplifiers 14R and 14B on color signals R and B, so that the white balance is adjusted correctly.

As described above, according to this invention, it is possible to achieve fully automatic adjustment of the white balance. More particularly, according to this invention, a logarithmic amplifier or AGC amplifiers of multi-stage connection are not required so that it is possible to avoid all the problems that will be caused by the logarithmic amplifier or the multi-stage AGC amplifier. Even when signals $R_1$ and $B_1$ are changed substantially in level relative to the displacement of the white balance, for example, when changing from an indoors locale with illumination by incandescent light bulbs to an outdoors setting with natural or sunlight illumination, the signals $R_1$ and $B_1$ are standardized with reference to the signal $G_1$ the level of which is not changed so much relative to the change of the white level. Therefore, from this standpoint, the automatic white balance control circuit according to this invention can carry out a stable operation and it is possible to adjust the white balance precisely.

In the embodiment described hereinabove, instead of applying the voltage $G_4$ to voltage comparator 34, it is possible to add together and average the voltages $R_4,G_4$ and $B_4$, and to supply the average voltage to comparator 34. This will be described more in detail with reference to Fig. 3, in which parts corresponding to those described with reference to FIG. 1 are identified by the same references and will not be again described in detail. As, for example, shown in FIG. 3, an adding and averaging calculator 37 receives the output signals from buffer amplifiers 26R,26G and 26B and produces therefrom an average voltage $G'_4$ which is applied to comparator 34 for comparison with the reference voltage $V_5$.

Figure 3:
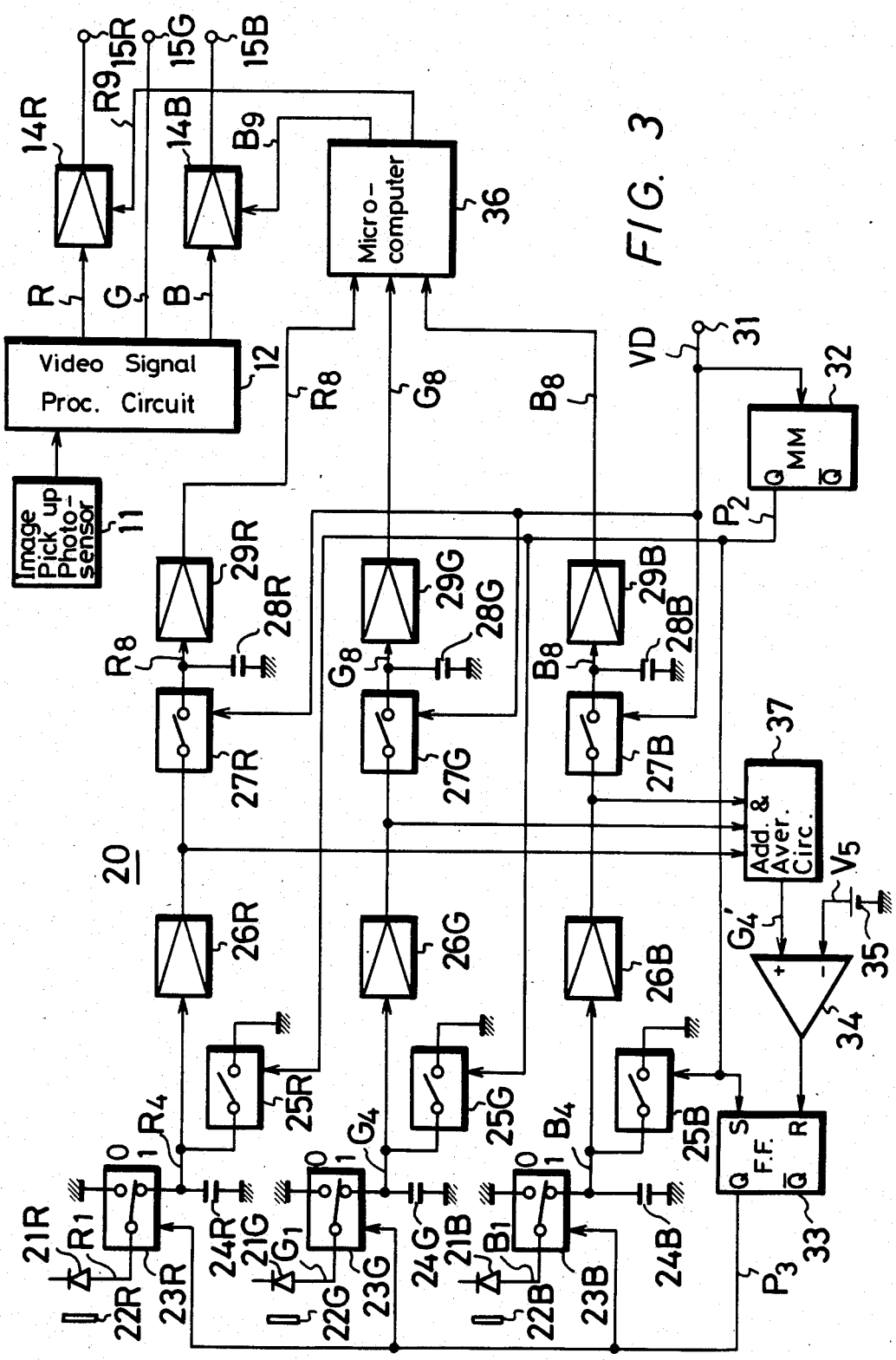
FIG. 3 is a systematic block diagram similar to that of FIG. 1, but showing another embodiment of the automatic white balance control circuit according to this invention.

Although in the embodiment of FIG. 1, there is a closed loop gain control for the signals R,G and B in response to the voltages $R_8,G_8$ and $B_8$, it is possible to provide an open loop gain control. For example, as shown in FIG. 3, the outputs $R_8,G_8$ and $B_8$ may be applied to a microcomputer 36 which suitably calculates therefrom the gain control voltages $R_9$ and $B_9$ for amplifiers 14R and 14B, respectively.

As set forth above, in accordance with this invention, in every operating cycle, for example, in each field period, the three capacitors 24R,24G and 24B are charged by output currents $R_1,G_1$ and $B_1$ derived from the three external light sensing elements 21R,21G and 21B, and, when the voltage comparator 34 produces a compared output, that is, when $G_4$ or $G'_4$ rises to the level of $V_5$, the charging of the three capacitors 24R,24G and 24B is stopped. The voltages on capacitors 24R,24G and 24B, at the time the charging is stopped, are sampled by the three sampling switch circuits 27R,27G and 27B and held by the three capacitors 28R,28G and 28B acting as hold-circuits, and subsequently delivered. Then, by means of the sampled and held voltages $R_8,G_8$ and $B_8$, the level ratio of the three primary color signals R,G and B in the output signals of the main photo-sensor 11 is controlled to be 1:1:1. Thus, it is possible to carry out the fully automatic white balance control. Moreover, since a logarithmic amplifier or a multi-stage AGC amplifier is not required, it is possible to avoid all the problems that will be caused by the use of a logarithmic amplifier and a multi-stage AGC amplifier.

Further, although the signals $R_1$ and $B_1$ are considerably changed in level with respect to the displacement of the white balance, the signals $R_1$ and $B_1$ are standardized with reference to the signal $G_1$ whose level is not changed so much relative to the change of white balance so that, from this viewpoint, it is possible to control the white balance accurately and stably.

Although preferred embodiments of the invention have been described above with reference to the drawings, it will be apparent that the invention is not limited to those precise embodiments, and that many modifications and variations could be effected therein by one skilled in the art without departing from the spirit or scope of the novel concepts of the invention, as defined by the appended claims.

We claim:

1. An automatic white balance control circuit comprising:
   main photo-sensing means for providing a color video signal;
   video signal processing means for deriving from said color video signal three primary color signals including a green color signal;
   level adjusting means for controlling the levels of said three primary color signals in respect to each other;
   three external light sensing elements having respective spectral characteristics which are the same as those of said main photo-sensing means in respect to the three primary colors corresponding to said three primary color signals, respectively;
   three capacitors for converting output currents from said three external light sensing elements to respective voltages;
   voltage comparator means for comparing, with a reference voltage, the voltage across at least the one of said capacitors corresponding to green light;
   means for initiating charging of said three capacitors by the output currents of the respective three external light sensing elements at a predetermined time in a repetitive operating cycle of the circuit, and for stopping the charging of said three capacitors in response to an output from said voltage comparator means indicating a predetermined relation of said voltage across at least said one capacitor to said reference voltage;
   three sample-and-hold circuits operative upon said stopping of the charging for sampling and holding voltages from said three capacitors, respectively; and
   control means responsive to the sampled-and-held voltages to provide control signals by which said level adjusting means controls the relative levels of said three primary color signals for maintaining a level ratio of 1:1:1 therebetween for achieving white balance.

2. An automatic white balance control circuit according to claim 1; further comprising switching means operative to supply said primary color signals to respective output terminals during each vertical scanning interval of said color video signal and to supply said sampled-and-held voltages to said output terminals in place of said primary color signals during each vertical blanking interval; and in which said level adjusting means includes gain controlled amplifier means for relatively varying the gains of said primary color signals at said output terminals; and said control means is responsive to said sampled-and-held voltages during each said vertical blanking interval for providing gain control signals for said amplifier means.

3. An automatic white balance control circuit according to claim 2; in which said gain controlled amplifier means includes first and second gain controlled amplifiers for red and blue color signals, respectively, supplied from said switching means to said respective output terminals; and said control means includes a first comparator for controlling the gain of said first amplifier on the basis of a ratio of said sampled-and-held voltages appearing, during said vertical blanking interval, at said output terminals from which red and green color signals, respectively, are otherwise derived, and a second comparator for controlling the gain of said second amplifier on the basis of a ratio of said sampled-and-held voltages appearing, during said vertical blanking interval, at said output terminals from which blue and green color signals, respectively, are otherwise derived.

4. An automatic white balance control circuit according to claim 3; in which said control means includes means for sampling-and-holding outputs of said first and second comparators at each said vertical blanking interval, and means for applying the sampled-and-held outputs of the first and second comparators as gain control signals for said first and second amplifiers, respectively, during each said vertical scanning interval.

5. An automatic white balance control circuit according to claim 1; in which said level adjusting means includes first and second gain controlled amplifiers receiving red and blue color signals from said processing means for adjusting the level of said red and blue color signals in respect to said green color signal; and said control means includes micro-computer means receiving said sampled-and-held voltages and providing gain control signals to said first and second amplifiers for maintaining said level ratio.

6. An automatic white balance control circuit according to claim 1; further comprising means for adding and averaging the voltages across said three capacitors and providing a resulting voltage applied to said voltage comparator means for comparison with said reference voltage.

7. An automatic white balance control circuit according to claim 1; in which said means for initiating and stopping the charging of said capacitors includes a switch for each of said capacitors connected between the respective capacitor and external light sensing element, flip-flop means having a set condition for closing each said switch and a reset condition for opening each said switch, said output of the voltage comparator means being applied to said flip-flop means for resetting the latter, and means responsive to a vertical synchronizing pulse for establishing said set condition of each said switch.

8. An automatic white balance control circuit according to claim 7; in which said means for establishing said set condition includes a monostable-multivibrator which is triggered by a falling edge of each said vertical synchronizing pulse for providing a delayed pulse, said delayed pulse being applied to said flip-flop means for setting the latter in response to the falling edge of said delayed pulse.

9. An automatic white balance control circuit according to claim 8; further comprising a second switch for each of said capacitors connected between the respective capacitor and ground and being closed in response to said delayed pulse for removing any charge from the respective capacitor prior to said charging thereof.

10. An automatic white balance control circuit according to claim 9; in which each of said sample-and-hold circuits includes a second capacitor and a third switch connected between the respective first-mentioned capacitor and said second capacitor and being closed in response to said vertical synchronizing pulse for charging said second capacitor with the voltage previously charged on said respective first capacitor.

11. An automatic white balance control circuit according to claim 10; further comprising switching means operative to supply said primary color signals to respective output terminals during each vertical scanning interval of said color video signal and to supply said sampled-and-held voltages from said second capacitor of each said sample-and-hold circuits to said output terminals in place of said primary color signals during each vertical blanking interval; and in which said level adjusting means includes gain controlled amplifier means for relatively varying the gains of said primary color signals at said output terminals; and said control means is responsive to said sampled-and-held voltages during each said vertical blanking interval for providing gain control signals for said amplifier means.

12. An automatic white balance control circuit according to claim 11; in which said gain controlled amplifier means includes first and second gain controlled amplifiers for the sampled-and-held voltages or red and blue color signals, respectively, which are alternatively supplied from said switching means to said respective output terminals; and said control means includes a first comparator for controlling the gain of said first amplifier on the basis of a ratio of said sampled-and-held voltages appearing, during said vertical blanking interval, at said output terminals from which red and green color signals, respectively, are otherwise derived, and a second comparator for controlling the gain of said second amplifier on the basis of a ratio of said sampled-and-held voltages appearing, during said vertical blanking interval, at said output terminals from which blue and green color signals, respectively, are otherwise derived.

13. An automatic white balance control circuit according to claim 12; in which said control means further includes means for sampling-and-holding outputs of said first and second comparators at each said vertical blanking interval, and means for applying the sampled-and-held outputs of the first and second comparators as gain control signals for said first and second amplifiers, respectively, during each said vertical scanning interval.

* * * * *